April 9, 1963     C. LIFKA     3,084,960
RAIN-TIGHT CONNECTOR
Filed Feb. 20, 1961
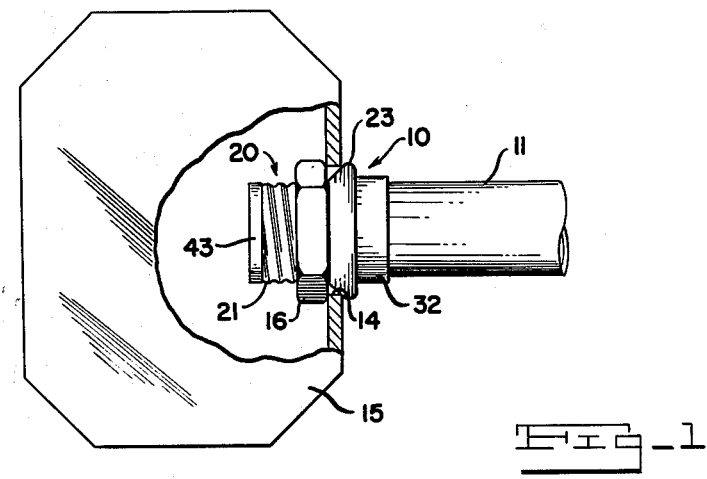
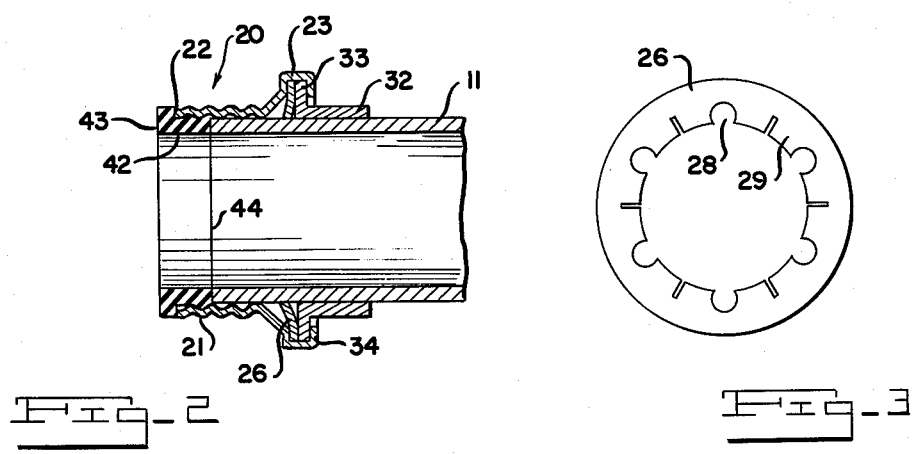
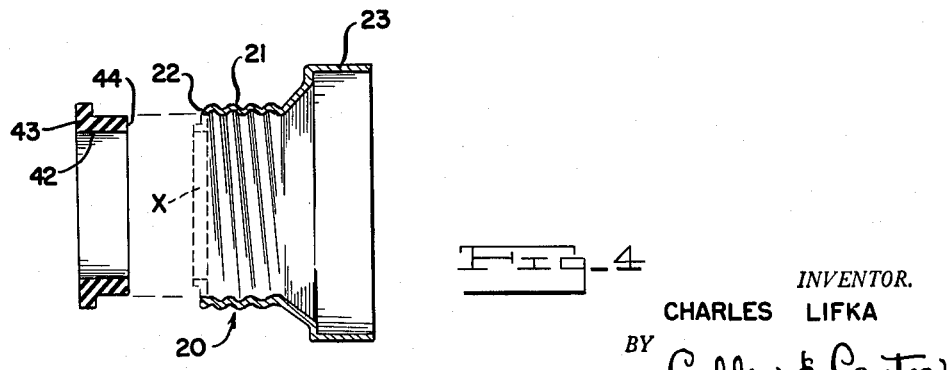
*INVENTOR.*
CHARLES LIFKA
BY Cullen & Cantor
ATTORNEYS

United States Patent Office 3,084,960
Patented Apr. 9, 1963

3,084,960
RAIN-TIGHT CONNECTOR
Charles Lifka, 20000 Sherwood Ave., Detroit 34, Mich.
Filed Feb. 20, 1961, Ser. No. 90,317
1 Claim. (Cl. 285—238)

This application relates to rain-tight connectors for electrical conduit and particularly to connectors generally of the character shown in a prior patent to Langley and Waring, No. 2,458,276.

An object of the present invention is to improve the connector shown in said patent, the specific improvement being the inclusion of an insulating waterproof plastic bushing in the connector to form a rain-tight connector.

Further objects of the invention will best be understood upon reference to the appended specification and the attached drawing.

In this drawing:

FIG. 1 illustrates the connector in use on a conduit and in place in a box.

FIG. 2 is an enlarged sectional view.

FIG. 3 shows a gripping ring.

FIG. 4 shows parts before assembly.

A connector 10 is applied to the end of a piece of conduit 11 known as thin wall conduit or tubing and so applied is inserted into a hole 14 of a box 15. A lock nut 16 is threaded on the connector to lock the parts in place in the box.

The connector of the invention and of the Patent No. 2,458,276 comprises an externally threaded tubular ferrule 20 of sheet steel having rolled threads 21 and having a forward end 22, and having its rear end outwardly bulged at 23 to contain a gripping ring 26 formed of thin stainless steel and having its inner edge notched at intervals 28 to provide between them gripping teeth 29. A guide sleeve 32 having its forward edge flanged outwardly at 33 is positioned with gripping ring 26 in outwardly bulged portion 23. Such outwardly bulged portion has its rear end turned inwardly and spun tightly over gripping ring 26 and flange 33 of sleeve 32 as at 34 to maintain the parts in assembly. Gripping ring 26 grips tightly on tubing 11 and locks the connector non-removably and firmly to it.

The improvement of this application is found in the fact that the ferrule, at its forward end 22, is of the same diameter as the threaded body portion 21, there being no forward end flange as in the ferrule of said patent; and in the fact that inside the ferrule, at end 22, is a ring or insulating waterproof bushing of a suitable plastic material having a cylindrical part 42 inside the ferrule and an outwardly projecting flange 43 forward of the ferrule. Part 42 is initially cylindrical as shown in FIG. 4 and after being inserted into the ferrule is laterally pressed or spun or molded into the rolled thread of the ferrule to interlock the bushing internally to the ferrule. The rear end 44 of the bushing is squared off to form a stop edge for conduit 11 and thus to form a rain-tight connector.

In making the ferrule hereof, the ferrule is initially formed with an internal flange or base $x$ at forward end 22, after which the thread 21 is rolled into the ferrule by pressure rollers. Then the bead, shown in dotted lines in FIG. 4 at $x$, is cut out or removed, to leave the ferrule as shown in full lines in FIG. 4, ready to receive the bushing 42.

Now having described the connector herein disclosed, reference should be had to the claims which follow.

A rain tight conduit connector comprising a tubular ferrule of sheet steel formed with a rolled thread providing an external and internal thread and having a forward end of the same diameter as the rolled thread portion of the ferrule; and an insulating waterproof plastic bushing permanently and non-removably mounted in the ferrule at the forward end; said bushing having a cylindrical part inside the ferrule whose rear edge provides a rain tight sealing stop for the forward end of a conduit to be received in the connector ferrule, said bushing also having an outwardly projecting flange forward of the ferrule and in sealing engagement with the forward end of the ferrule; with the cylindrical part laterally pressed into the rolled thread of the ferrule to be deformed into such thread to interlock the bushing permanently and inside the ferrule.

References Cited in the file of this patent
UNITED STATES PATENTS

| | | |
|---|---|---|
| 1,245,077 | Webster | Oct. 30, 1917 |
| 1,708,657 | Brown et al. | Apr. 9, 1929 |
| 2,291,706 | Freaze | Aug. 4, 1942 |
| 2,458,276 | Langley et al. | Jan. 4, 1949 |
| 2,551,834 | Ferguson | May 8, 1951 |